J. H. GINET, Jr.
ADDING MACHINE.
APPLICATION FILED APR. 9, 1906. RENEWED JAN. 26, 1909.
932,462.
Patented Aug. 31, 1909.
8 SHEETS—SHEET 1.
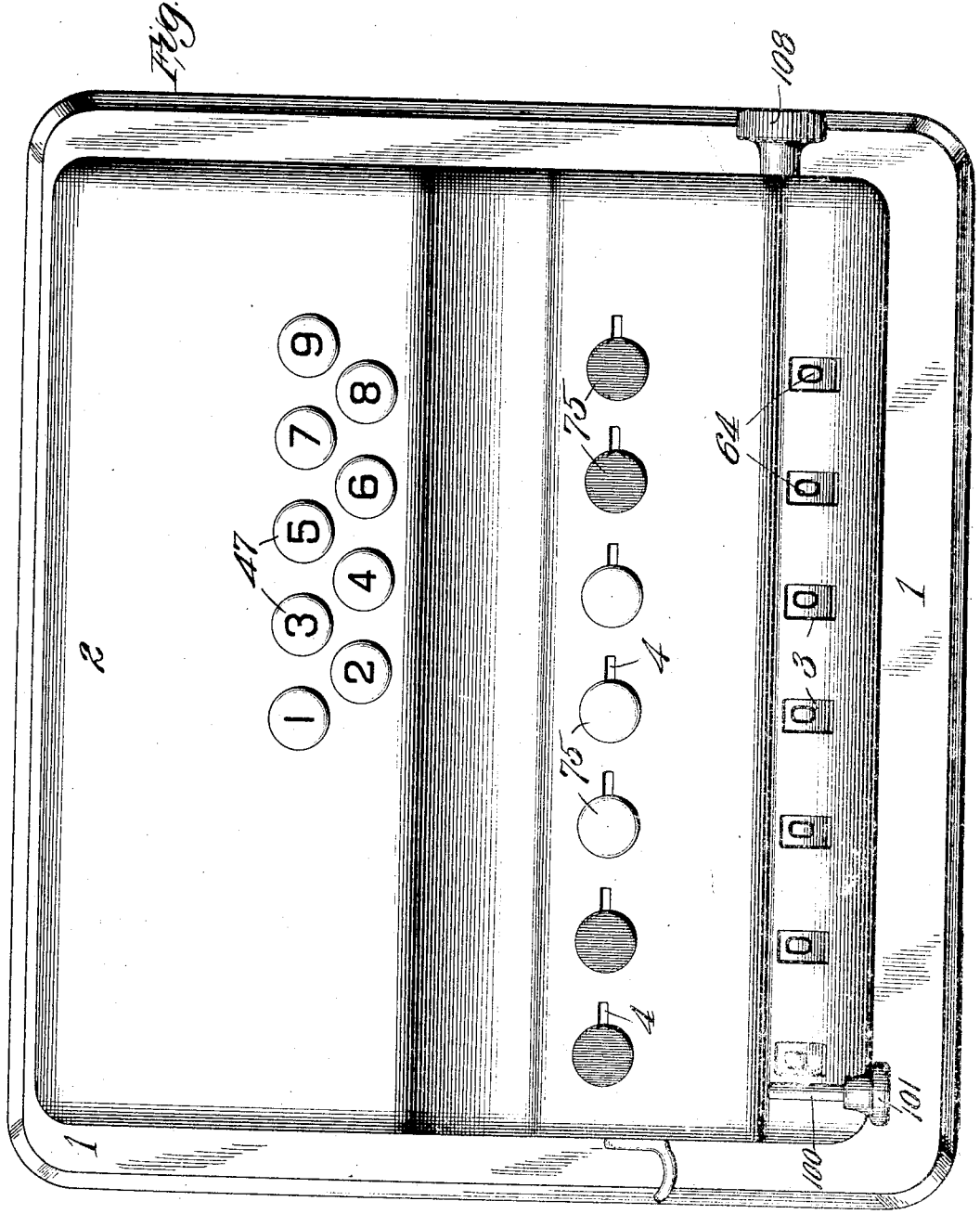

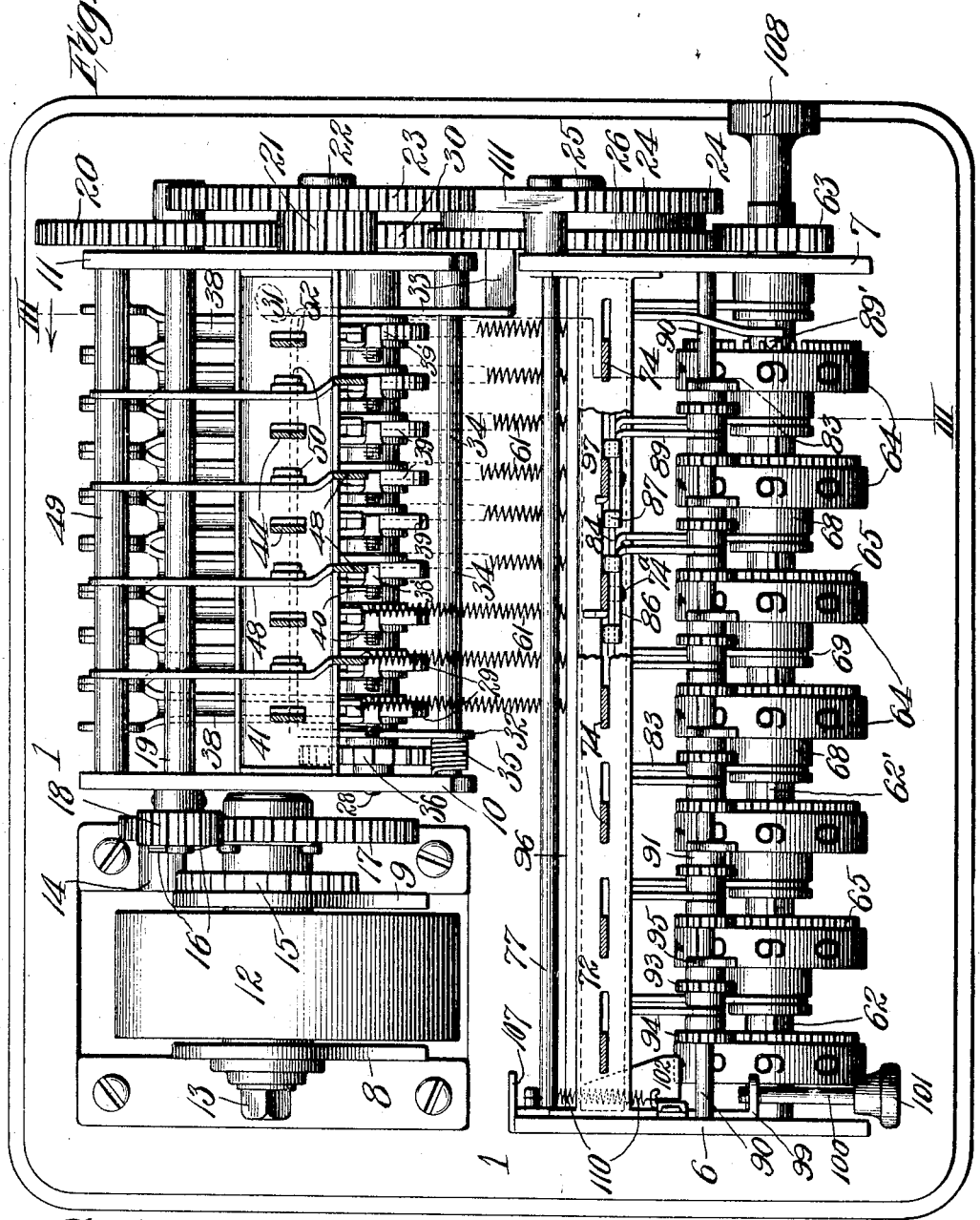

J. H. GINET, Jr.
ADDING MACHINE.
APPLICATION FILED APR. 9, 1906. RENEWED JAN. 26, 1909.
932,462.
Patented Aug. 31, 1909.
8 SHEETS—SHEET 3.
Fig. III.
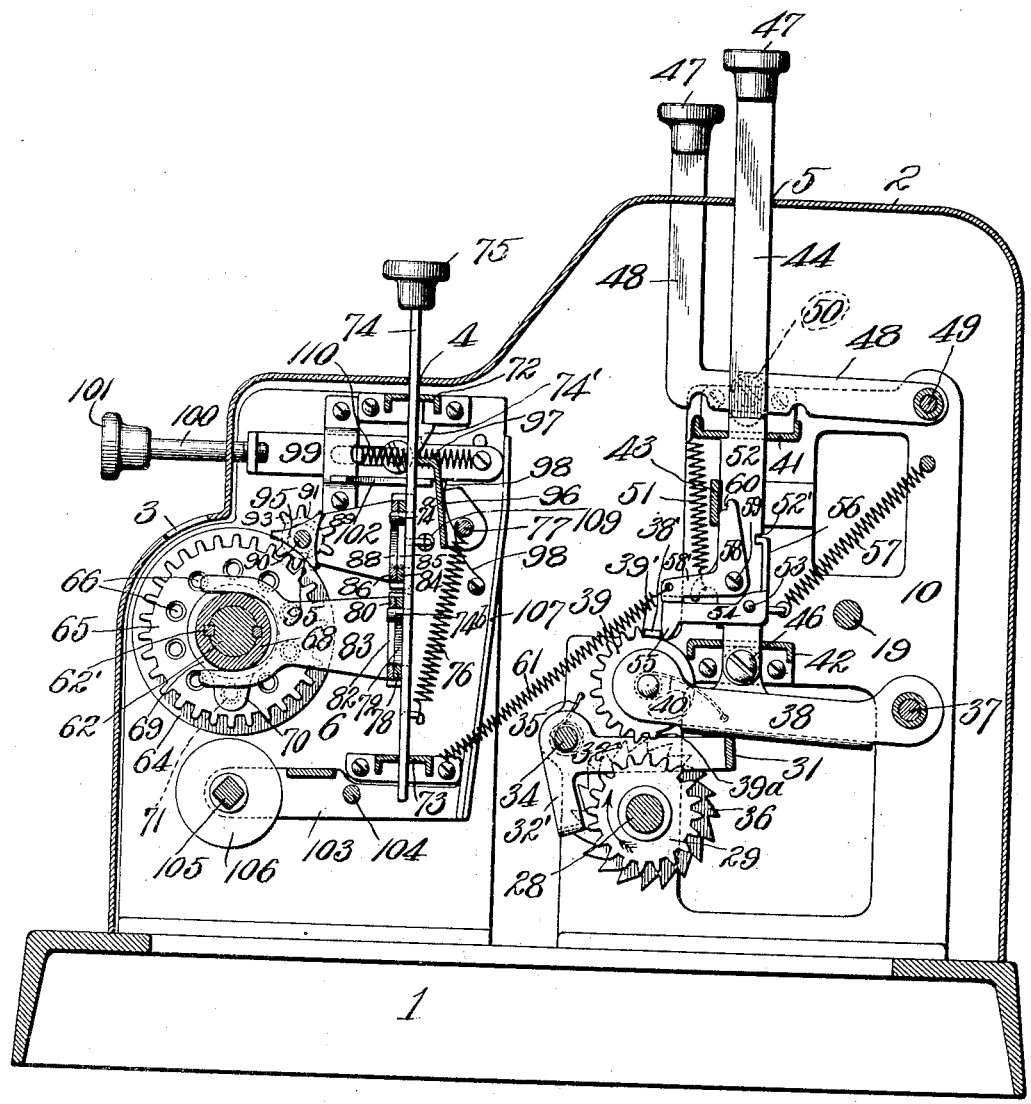
Attest:
Wm H Scott
Blanche Hogan
Inventor:
J. H. Ginet, Jr.
by Wright Bro
Attys.

J. H. GINET, Jr.
ADDING MACHINE.
APPLICATION FILED APR. 9, 1906. RENEWED JAN. 26, 1909.
932,462.
Patented Aug. 31, 1909.
8 SHEETS—SHEET 4.
Fig. IV.
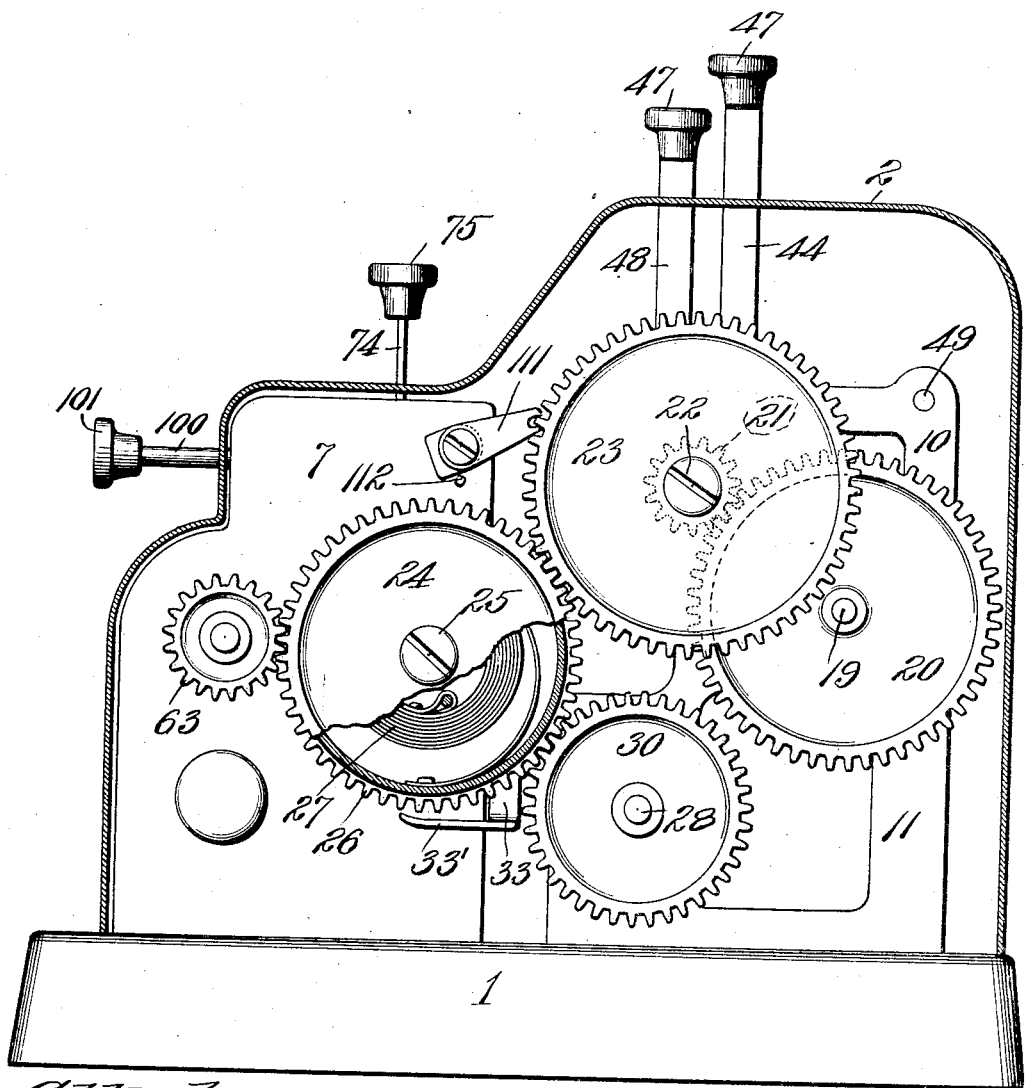

J. H. GINET, Jr.
ADDING MACHINE.
APPLICATION FILED APR. 9, 1906. RENEWED JAN. 26, 1909.
932,462.
Patented Aug. 31, 1909.
8 SHEETS—SHEET 5.
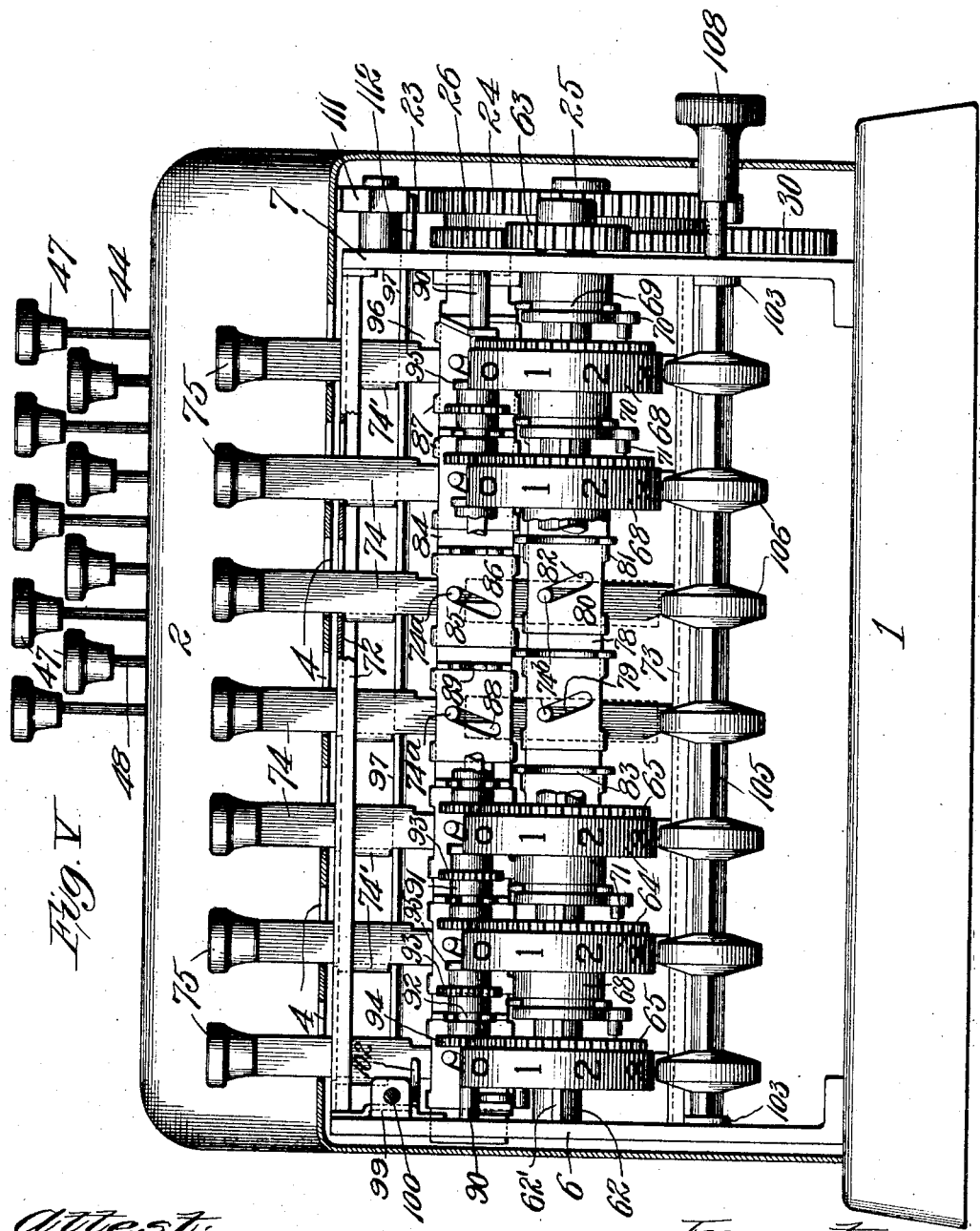

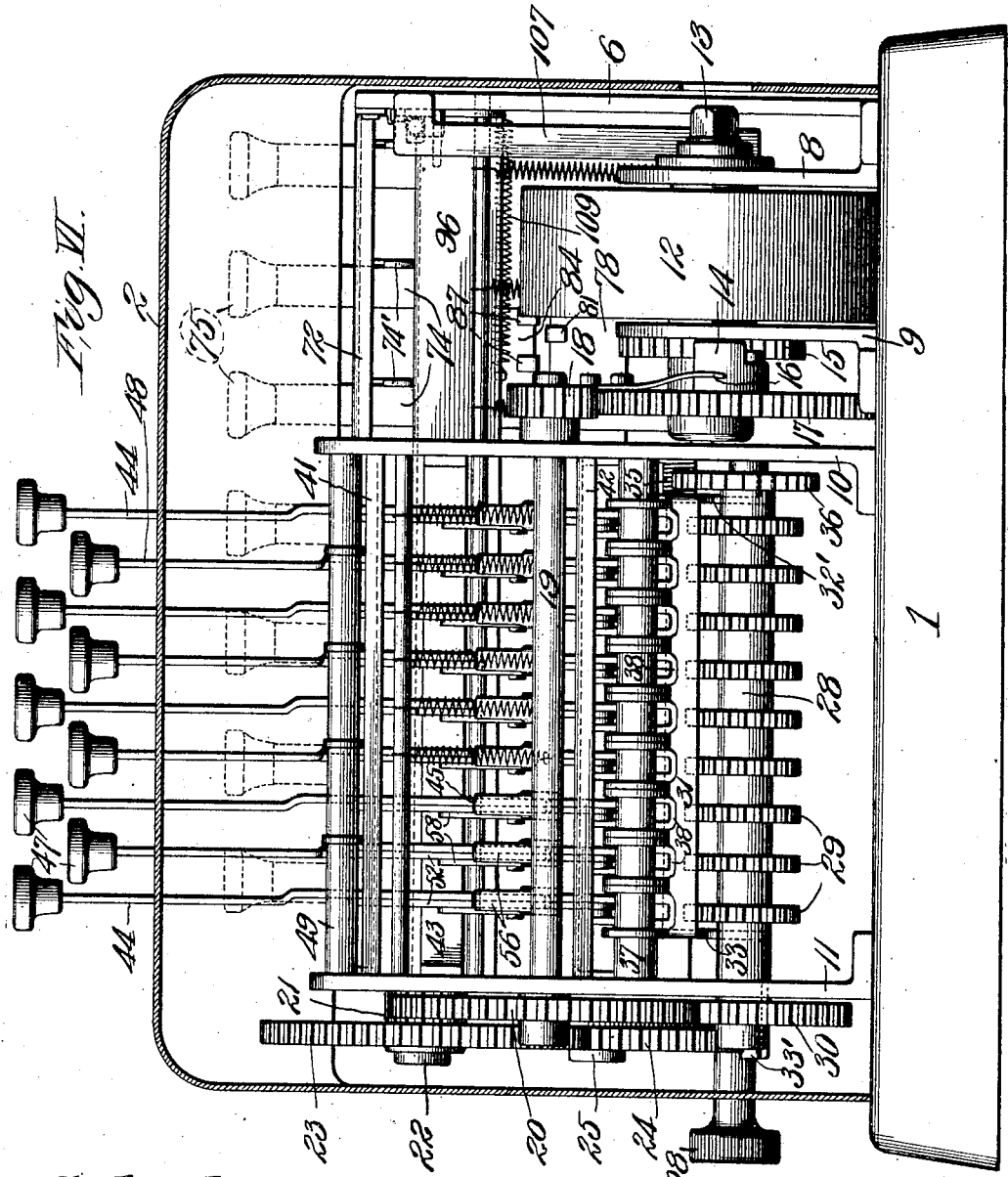

J. H. GINET, Jr.
ADDING MACHINE.
APPLICATION FILED APR. 9, 1906. RENEWED JAN. 26, 1909.
932,462.
Patented Aug. 31, 1909.
8 SHEETS—SHEET 7.
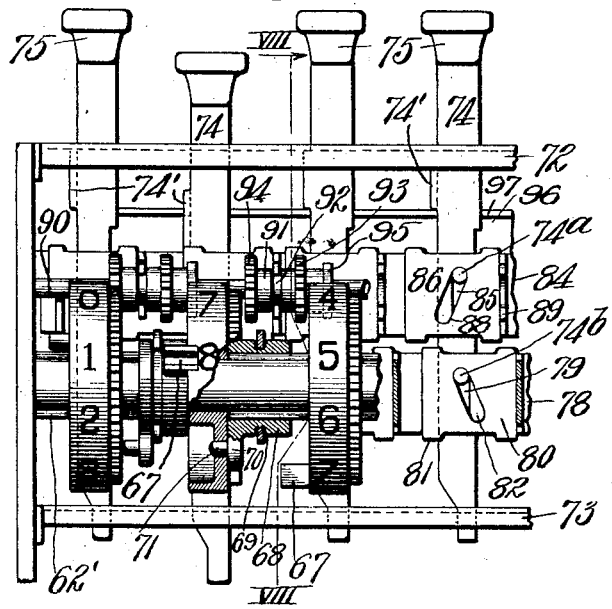
Fig. VII.
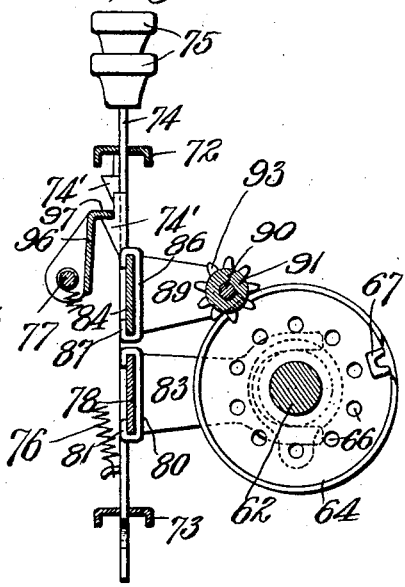
Fig. VIII.
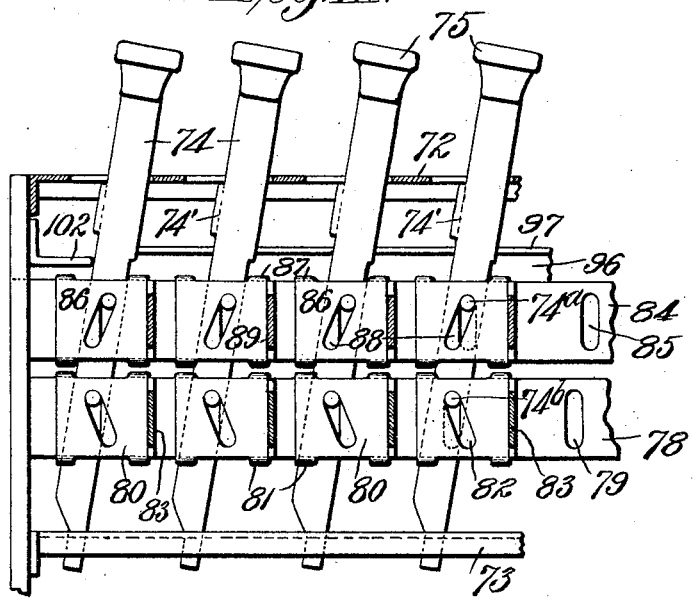
Fig. IX.
Attest:
Wm H Scott
Blanche Hogan
Inventor:
J. H. Ginet, Jr.
by Knight Bro.
Attys

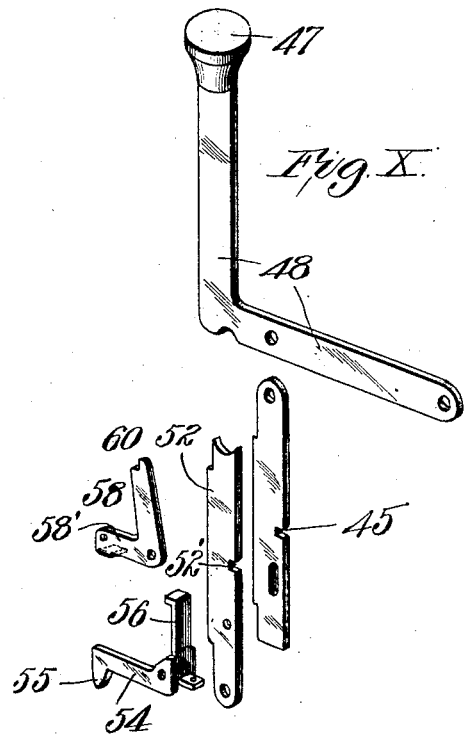
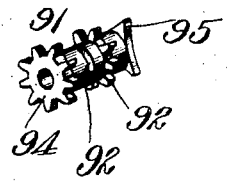
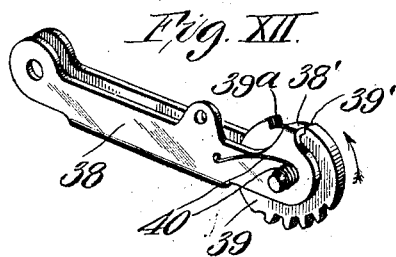

UNITED STATES PATENT OFFICE.

JOSEPH H. GINET, JR., OF DENVER, COLORADO.

ADDING-MACHINE.

932,462. Specification of Letters Patent. Patented Aug. 31, 1909.

Application filed April 9, 1906, Serial No. 310,767. Renewed January 26, 1909. Serial No. 474,332.

*To all whom it may concern:*

Be it known that I, JOSEPH H. GINET, Jr., a citizen of the United States, residing in Denver, in the county of Denver and State of Colorado, have invented certain new and useful Improvements in Adding-Machines, of which the following is a full, clear, and exact description, reference being had to the accompanying drawings, forming part of this specification.

My invention relates to an adding machine of the nature of that shown and described in United States Letters Patent No. 806,795, granted to me December 12, 1905.

Figure I is a top or plan view of my machine. Fig. II is a top or plan view of the machine with the casing or cover removed and the key bars shown in horizontal or cross section. Fig. III is a vertical cross section taken on line III—III, Fig. II. Fig. IV is an elevation of the gearing end of the machine with the casing in transverse section and the governor gear wheel shown partly in section. Fig. V is a front elevation of the machine with the casing shown in vertical longitudinal section. Fig. VI is a rear elevation of the machine with the casing shown in vertical longitudinal section. Fig. VII is a view partly in elevation and partly in vertical section of a series of the counting wheels and the actuating and controlling members associated therewith. Fig. VIII is a vertical section taken on line VIII—VIII, Fig. VII. Fig. IX is a view partly in elevation and partly in vertical section of the counting wheel controlling mechanism. Fig. X is a perspective view of the digit wheel controlling member in detached condition. Fig. XI is a perspective view of one of the transfer members associated with the counting wheels. Fig. XII is a perspective view of one of the digit wheels and the swinging arm by which it is carried.

1 designates the base of my machine which is surmounted by a casing 2 of suitable shape and which is provided with a plurality of sight openings 3 through which the numerals on the counting wheels of the machine may be observed, and also with a plurality of slots or openings 4 and 5 in which the various keys of the machine operate.

6 and 7 are forward standards mounted upon the base 1 and adapted to support the counting wheels and the operating and controlling mechanism directly associated therewith.

8 and 9 are standards mounted upon the base and adapted to support the motor of the machine and 10 and 11 are standards also mounted upon the base and adapted to support the digit mechanism of the machine.

Referring next to the motor of the machine: 12 designates a main-spring and 13 a main-spring shaft that is journaled in the standards 8 and 9 and which is adapted to receive power from said spring. One end of the main-spring is connected to said shaft and the other end is held in a fixed position by attachment to a member rigidly secured to either of the standards 8 and 9 or any other part to which it can be conveniently applied. The main spring may be wound by rotating the shaft 13 through the medium of a suitable key applied thereto and when this is accomplished the spring is held under tension by a pawl 14 (see Figs. II and VI) that engages a ratchet wheel 15 on the main-spring shaft, the pawl being preferably held in engagement with the ratchet wheel by a spring 16.

17 designates a master wheel fixed to the main spring shaft and by which the pawl 14 is carried. The master wheel meshes with a pinion 18 that is fixed to a primary driving shaft 19 that is journaled in the standards 10 and 11 and extends to the side of the machine farthest removed from its motor. The primary driving shaft has fixed to it a primary driving gear wheel 20 that is arranged in mesh with a pinion 21 which is journaled upon a stub shaft 22.

23 is a secondary driving gear wheel rigidly associated with the pinion 21 and adapted to be driven thereby.

24 designates a governor gear wheel that is loosely mounted upon a stub shaft 25 seated in the forward standard 7 and with which the secondary driving gear wheel 23 meshes.

26 is a transmission gear wheel located alongside of the governor wheel 24 and also loosely mounted upon the shaft 25. The governor gear wheel 24 and transmission gear wheel 26 are united to each other by a governor spring or equalizing spring 27 (see Fig. IV), one end of which is secured to one of said wheels while the other end is secured to the other wheel. The transmission gear wheel 26 is arranged to drive certain parts of the mechanism to be presently described and the power for the operation of said wheel is derived from the main-spring 12 of the machine which is communicated thereto through the governor wheel 24. The object of thus communicating the power to said transmission wheel is to maintain an equal power action upon the transmission wheel at all times irrespective of the degree of tension in the main spring of the machine which naturally decreases as the spring expands in its unwinding action, and is increased when the main spring is wound. It will be seen that by employing the governor or equalizing spring 27 said spring is put under tension each time that the governor wheel is rotated by the secondary driving wheel 23 to store power in the spring in order that it will thereafter act as a supplemental power member to drive the transmission gear wheel 26 with uniform action upon each operation. It should be here mentioned that for the purpose of securing the action of the governor spring the governor gear wheel 24 is held from rotation in a manner to be presently explained while said governor spring is acting to rotate the transmission gear wheel 26.

28 designates a tumbler shaft that is journaled in the standards 10 and 11 and to which is fixed a series of toothed wheels 29 corresponding in number to the numerals "1" to "9" inclusive. The tumbler shaft 28 has fixed to it a gear wheel 30 that is arranged in mesh with the transmission gear wheel 26 so that said transmission gear wheel will act to operate said tumbler shaft.

31 designates a trip bar arranged parallel to the tumbler shaft 28 and which is provided with arms 32 and 33 that are rockingly supported by a rod 34 mounted in the standards 10 and 11 (see Figs. II and III). The trip bar 31 is acted upon and normally held by a spring 35 surrounding the rod 34 and having one of its ends fixed to a portion of the trip bar and its other end held in a fixed position by attachment to a stationary part of the machine. The tumbler shaft 28 has rigidly mounted thereon a ratchet wheel 36 and the arm 32 of the trip bar 31 is provided with a pawl 32′ that is adapted to be normally maintained in engagement with said ratchet wheel 36 under the influence of the spring 35. The arm 33 of the trip bar 31 extends beyond the trip bar supporting rod 34 forwardly and laterally, and terminates in a detent arm 33′ that is adapted to engage the governor wheel 24 to hold said wheel from rotation while the governor spring 27 is acting to drive the transmission gear wheel 26 in the manner previously explained.

37 designates a rod mounted in the standards 10 and 11 at the rear of the machine.

38 are swinging arms corresponding in number to the number of toothed wheels 29 on the tumbler shaft 28, each of these arms being rockingly supported by the rod 37 and having their forward free ends superimposed above the tumbler shaft 28 and the trip bar 31. The swinging arms 38 have journaled in their free ends digit wheels or segments 39 that are adapted to be brought into meshing engagement with the toothed wheels 29 on the tumbler shaft 28. The digit wheels are provided with varied numbers of teeth according to the particular digits from "1" to "9" inclusive, in order that they will determine the degree of rotation of the tumbler shaft 28 when they enter into mesh with the toothed wheels 29 on said shaft. The digit wheels are preferably provided with forward shoulders 39′ (see Figs. II, III and XI) and rear shoulders 39ᵃ. Each digit wheel has connected to it one end of a return spring 40, the other end of which is connected to the corresponding arm in which said digit wheel is mounted. These return springs serve to retract the digit wheels after said wheels are rotated and have served their function by meshing with the toothed wheels 29 on the tumbler shaft 28. When the digit wheels are retracted under the action of said springs the degree of rotation of said wheels is restricted by stop fingers 38′ projecting laterally from the swinging arms 38 and over the digit wheels and adapted to be engaged by the forward shoulders 39′ of the digit wheels.

41 and 42 are respectively upper and lower apertured guide bars supported by the rear standards 10 and 11, and 43 is a catch bar located between said guide bars and also supported by said standards.

44 designates main key stems that operate through the guide bars 41 and 42 and each of which is provided at its rear edge with a notch 45 (see Fig. X) that receives a member to be hereinafter more particularly referred to. The main key stems are pivotally connected at 46 to the swinging arms 38 in order that said swinging arms may be depressed when the key stems are moved downwardly for the purpose of lowering the digit wheels into engagement with the toothed wheels 29 on the tumbler shaft 28, and also for the purpose of releasing the spring controlled pawl 32′ from engagement with the ratchet wheel 36 to permit rotation of said tumbler shaft, the said pawl releasing action being secured due to the operation of the swinging arms against the trip bar 31. A part of the main key stems 44 extend in direct vertical lines through the apertures 5 in the casing of the machine at its top and are provided with keys 47. The remainder of said key stems terminate above the upper guide bar 41 and within the casing and have attached to them the L-shaped bars 48 that are rockingly mounted upon a rod 49 mounted in the rear standards 10 and 11. These L-shaped key bars extend laterally from the rod 49 and have the corresponding main key stems pivoted to them at 50 (see dotted lines Fig. III) and extend upwardly from a position in front of said pivotal points and through the top of the casing of the machine into juxtaposition to the entirely vertical main key stems 44. Each of the key bars 48 is provided with a key 47. The object in using the L-shaped key bars is to so position all of the keys 47 that they may be readily operated without interference or without a wrong key being struck by the operator while at the same time economizing in the length or breadth of the machine.

51 are lift springs by which the main key stems 44 are elevated after they are depressed, these springs being each connected to said key stems at one end and having their other end attached to the upper guide bar 41.

52 designates controlling or supplemental key stems that are located alongside of the main key stems 44 and have slot and pin connection therewith (see Fig. X), which, with the parts associated therewith, and to be now described, constitute guard mechanism for preventing retrograde rotation of the digit wheels when an unsteady pressure is exerted upon the main key stems or a slow pressure is exerted thereupon instead of a quick positive pressure. Each controlling stem has pivoted to it at 53 a dog 54 that includes a pawl 55 which extends into proximity with the periphery of the corresponding digit wheel 39, and is adapted to be engaged by the shoulder 39ª of said wheel after the digit wheel has partaken of the proper rotation to govern the degree of rotation of the toothed wheels 29 according to the particular digit wheel. Each dog 54 also has a catch arm 56 that normally rests in a notch 52' in the corresponding controlling stem 52 and in the notch 45 of the adjacent main key stem. Each dog 54 is yieldingly held by a spring 57 whereby the pawl 55 is normally maintained in juxtaposition with the periphery of the corresponding digit wheel and the catch arm 56 is normally maintained in the notches of the main key stem and controlling stem to which it applies.

58 designate lock members that are preferably of bell-crank shape and are pivoted to the controlling stems at 59. Each of these lock members is provided with a shoulder 60 that is adapted to engage beneath the catch bar 43 when the key stems and controlling stems are depressed, the shoulder being held in such position due to the action of a pull spring 61 attached to the pressure arm 58' of the lock member and which serves to hold said pressure arm in a lowered position, whereby it is caused to retain the pawl 55 of the dog 54 immediately beneath it against the periphery of the digit wheel that it surmounts, and the catch arm 56 of said dog in the main key stem and controlling stem notches 45 and 52'. When each main key stem is depressed to carry the corresponding digit wheel into mesh with the corresponding tumbler shaft wheel 29 beneath it, the swinging arm 38 that carries said digit wheel is moved downwardly and presses against the trip bar 31 with the result of moving said trip bar and withdrawing its pawl 32' from engagement with the ratchet wheel 36 in order that the tumbler shaft may be rotated by the power mechanism of the machine. It may be here stated that when this action takes place the pawl 32' carried by the trip bar is thrown into engagement with the governor wheel 24 to hold said wheel from rotation for the purpose hereinbefore explained. As each main key stem 44 is lowered it carries therewith the corresponding controlling stem 52, due to the catch finger 56 of the dog 54 carried by said controlling stem being situated in the adjacent notches 45 and 52' located in said stems. At the time that each digit wheel enters into mesh with the corresponding tumbler shaft wheel 29 the lock member is drawn forwardly under the action of the pull spring 61 connected to its pressure arm, this movement being permitted due to the shoulder 60 of the lock member being lowered to the lower edge of the catch bar 43 in juxtaposition thereto. Upon this action taking place the shoulder 60 moves beneath said catch bar and serves to momentarily lock or retain the key stems in a lowered position, in which position they are held until the digit wheel has completed the required movement according to the number of its teeth. Immediately upon the digit wheel completing its rotation the shoulder 39ª of the digit wheel strikes against the rear side of the pawl 55 presented to the perimeter of said wheel, with the result of tripping said pawl upwardly, whereby it is caused to exert an upward pressure against the pressure arm 58' of the lock member 58 by overcoming the pull spring 61 so that the shoulder 60 of said lock member is rocked from its position beneath the catch bar 43. When this action occurs the main key stem is promptly moved upwardly under the action of the pull spring 51 attached thereto and the digit wheel withdrawn from the tumbler shaft wheel 29 with which it previously meshed. Each dog 54 is tripped by the actuation of its pawl 55 the catch finger 56 of said dog is removed from the notches 45 and 52' in the main and controlling stems 44 and 52, whereby said controlling stem is released to be drawn upwardly under the action of the corresponding pull spring 57, in order that when the main key stem resumes its uplifted position the notches in the stems will be in alinement to again receive the catch finger, thereby placing the parts in condition for the next operation.

The digit wheel mechanism that has been described constitutes the means for governing the actuation of the counting wheel mechanism due to its controlling the transmission wheel 26 and said transmission wheel serves to drive the counting wheel mechanism that will next be described.

62 designates a counting wheel shaft that is journaled in the forward standards 6 and 7 and which has fixed thereto a pinion 63 arranged in mesh with the transmission gear wheel 26 to be driven thereby. On the counting wheel shaft is mounted a plurality of counting wheels 64 that bear numerals from "1" to "9" inclusive and "0." Any desirable number of these counting wheels may be used but in the drawings I have shown seven of such wheels to provide for the addition of numbers into the millions, the counting wheel at the extreme right being the "units" wheel and the one at the extreme left being the "millions" wheels. The counting wheels are loosely mounted upon the counting wheel shaft and said shaft is provided intermediate of the counting wheels with splines 62' (see Figs. II and III). Each of the counting wheels is provided with a gear member 65 having peripheral teeth and in the side of each of the gear members are pockets 66 corresponding in number to the number of numeral characters on the perimeter of the counting wheel. Each of the counting wheels is also provided with a notched transmission arm 67 (see Figs. VII and VIII) projecting laterally from the wheel at its perimeter and adapted to engage a transmission member to be hereinafter mentioned.

68 are tumblers which are slidably fitted to the counting wheel shaft adjacent to the various counting wheels to which they correspond, the said tumblers being held from rotation relative to said shaft by engagement with its splines 62'. The main portion of each tumbler is in the form of a collar having an annular groove 69 therein and each tumbler includes an arm 70 which is provided with a pin 71 adapted to enter either of the pockets 66 in the counting wheel gear member to which said tumbler corresponds. The office of the tumblers 68 is that of imparting rotation to the different counting wheels according to whichever tumbler is thrown into engagement with its particular counting wheel to drive it during the rotation of the counting wheel shaft on which all of the counting wheels are loosely mounted as before stated, while the tumblers are slidable on but not rotatably fitted to the counting wheel shaft.

72 designates an upper guide bar and 73 a lower guide bar, both of which are supported by the forward standards 6 and 7 and are apertured for the operation of key bars therein.

74 designates key bars corresponding in number to the number of counting wheels and arranged to operate in said guide bars. These key bars extend through the apertures 4 in the casing 2 and are provided exterior of the casing with keys 75. Each key bar 74 is subject to the action of a lift spring 76 that is connected at one end to the key bar and has its other end attached to a fixed part of the machine, such for instance as a rod 77 mounted in the forward standards 6 and 7 (see Figs. II and III). Each key bar 74 is provided with a cam arm 74' extending in a rearward direction from the bar and each of said bars is also provided with an upper throw pin 74ª and a lower throw pin 74ᵇ.

78 designates a lower shifter supporting bar rigidly mounted in the forward standards 6 and 7 at the rear of the counting wheels 64 and alongside of the key bars 74, the said bars being provided with vertical slots 79 in which the throw pins 74ᵇ of the keys 75 are adapted to operate during their vertical movement.

80 are shifters, the bodies of which are fitted to the shifter supporting bar 78 to which they are preferably held by lips 81 that embrace the bar. In the body of each shifter 80 is a diagonally extending slot 82 in which the throw pin 74ᵇ of the corresponding key bar operates to impart reciprocatory movement to the shifter during the downward and upward movement of the key bar. Each shifter 80 has a forwardly extending bifurcated arm 83 that embraces the corresponding tumbler 68 by fitting in its groove 69 as seen in Figs. II, III, V and VII. When either of the key bars 74 is depressed, whether it be that corresponding to the "units," "tens" or any other counting wheel in the machine, the corresponding shifter 80 is reciprocated on the lower supporting bar 78 to carry the corresponding tumbler toward its counting wheel and cause the tumbler pin 71 to enter into a pocket 73 of the mating counting wheel, thereby causing the counting wheel to be locked from rotation on the counting wheel shaft and rotate with the shaft, due to the engagement of the tumbler therewith.

84 designates an upper shifter supporting bar that is reciprocally mounted in apertures in the forward standards 6 and 7 in order that it may be moved to and fro longitudinally of the series of counting wheels. This upper shifter supporting bar is located immediately above the lower shifter supporting bar 78 and alongside of the key bars 74. The upper shifter supporting bar contains vertical slots 85 in which the key bar throw pins 74ª operate.

86 are shifters reciprocally fitted to the upper bar 84 and preferably held thereto by lips 87 that embrace the bar. In the body of each shifter 86 is a diagonal slot 88 in which the corresponding key bar throw pin 74ª operates to impart reciprocal movement to the shifter associated therewith. Each shifter 86 is provided with a forwardly extending bifurcated arm 89.

90 designates a horizontally positioned rod mounted in the forward standards 6 and 7.

91 are transfer members loosely mounted on the rod 90 intermediate of the various counting wheels, said members being arranged both for reciprocation and rotation on said rod. Each of the transfer members is provided with an annular groove 92 to which a corresponding bifurcated shifter arm 89 is fitted in order that the transfer member may be reciprocated into and out of engagement with the counting wheel it acts upon. Each transfer member also has a pinion 93 adapted to be engaged by the transfer arm 67 of the counting wheel from which transfer is to be made to the counting wheel of the next higher denomination, and each transfer member also has a pinion 94 that is arranged to be thrown into engagement with the gear member 65 of the counting wheel to which transfer is to be made when the transfer arm 67 engages the transfer member pinion 93. Each transfer member 91 also includes a multiple arm stop wheel 95 that constantly occupies a position above the perimeter of the counting wheel to which it applies and serves to hold the transfer member associated with the counting wheel from which transfer is to be made from rotation until transfer from one counting wheel to another is made upon the transfer arm 67 of the transferring wheel is brought into registration with the transfer member pinion 93, at which time the stop wheel is permitted to enter into said transfer arm due to the counting wheel being slightly cut away at the location of said transfer arm, as seen in Fig. VIII.

When either of the key bars 74 is depressed, the throw pin 74ª carried thereby operates in a vertical slot 85 in the shifter supporting bar 84 and also in the diagonal slot 88 of the corresponding shifter 86 as a result the transfer member to which said shifter is fitted is thrown toward the right and out of engagement with the corresponding counting wheel at the left thereof in order that said counting wheel may have rotation imparted thereto, through rotation of the counting wheel shaft, and act in turn upon the next adjacent counting wheel toward the left by transferring to it through the medium of the transfer member at the left thereof.

96 designates a lock bar that is rockingly mounted upon the rod 77 and located at the rear of the key bars 74, this lock bar being provided at its upper edge with a forwardly extending flange 97 arranged in the path of travel of the key bar cams 74'. The lock bar is normally held with its flange pressed against said key bars by a spring 98 that bears thereagainst. When either of the key bars is depressed its cam 74' operates to throw said lock bar rearwardly, and the cam then passes into a position beneath the lock bar flange with the result that said flange serves to hold the key bar depressed. The shifter 83 is therefore retained in a position to hold the corresponding tumbler 68 to which it is fitted in engagement with the counting wheel to which it is moved.

When it is desired to count into a higher or lower denomination the key bar 74 corresponding to the denomination in which counting is to be accomplished is depressed without the necessity of first releasing the previously depressed key bar, which is released due to the cam of the latest depressed key bar acting to trip the lock bar 96 and release the previously depressed key bar, which is released due to the cam of the latest depressed key bar acting to trip the lock bar 96 and release the previously depressed key bar, which is returned to its uplifted position by its pull spring 76 before the cam 74' of the last depressed key bar is engaged by the lock bar. The pinions 94 of the transfer members serve to prevent accidental rotation of all of the counting wheels except the "units" counting wheel due to their engagement with the gear members of said wheels, and therefore no other locking means for preventing accidental displacement is required. The "units" counting wheel is not controlled by a transfer member and for the purpose of preventing accidental displacement thereof, I form upon the arm of the upper shifter corresponding to said "units" wheel a detent 89' (see Fig. II), that is adapted to enter into engagement with said gear member when the "units" wheel shifter is shifted and the "units" wheel is to be operated.

For the purpose of freeing the counting wheels and at the same time either of the key bars 74 that may be at the time depressed, in order that the counting wheels may be returned to zero, I employ the following mechanism: 99 designates a slide reciprocally supported by the front standard 6 and provided with a push rod 100 which bears a knob 101. The slide 99 is provided with a horizontal cam 102 that projects into proximity with the first key bar 74 at the side of the machine at which said slide is located and which is adapted to exert pressure against said key bar to move it laterally when the slide is moved rearwardly. When this engagement of the cam and key bar occurs the key bar is rocked toward the opposite side of the machine and, due to its upper throw pin 74ª being seated in the upper shifter supporting bar 84, said shifter supporting bar is moved toward the right, with the result of rocking all of the key bars in a corresponding direction, a movement that is occasioned due to the presence of the upper throw pins of all the key bars in said supporting bar. When the supporting bar is moved as stated the entire number of upper shifters 86 are shifted toward the right so that the pinions 94 of the transfer members 92 are all withdrawn from the gear members 65 of the counting wheels. The counting wheels are thereby freed to permit of their being rotated freely on their shaft to bring the zero character on the wheels into view beneath the casing sight openings 3.

103 is a frame rockingly mounted beneath the counting wheels upon a rod 104 supported by the forward standards 6 and 7. In this frame is journaled a shaft 105 on which are rigidly mounted a series of friction wheels 106 corresponding in number to the number of counting wheels and adapted to be brought into frictional engagement with said counting wheels. The frame 103 has fixed to it an upwardly extending arm 107, the upper free end of which is located at the rear end of the slide 99 and is adapted to be acted upon by said slide to throw it rearwardly. When the slide is moved rearwardly it operates against the arm 107 and by so doing causes the frame 103 to be rocked upwardly and the friction wheels to be moved into contact with the counting wheels. The shaft 105 is then rotated and the counting wheels are turned by the friction wheels until they are brought to the desired adjustment. The friction wheel shaft has applied to it a knob 108 that is located exterior of the casing of the machine and by which said shaft may be readily turned. The upper shifter supporting bar 84 has connected to it a return spring 109 (see Fig. III) by which it is retracted after it has been shifted to accomplish the release of the counting wheels and the slide 99 has connected to it a return spring 110 (see Figs. II and III) by which it is retracted.

I wish to call particular attention to the arrangement of the key stems and the keys associated therewith by which the digit wheel mechanism of my machine is thrown into action. These key stems and their keys are, as seen most clearly in Fig. I, arranged in two banks in which the bank nearest the front of the machine contains four keys and the other or rear bank contains five keys, thus completing the series of digits. This arrangement of keys is a highly important one in that it provides for much more efficient and rapid actuation of the digit mechanism through the medium of the key stems, due to their arrangement providing for the operator of the machine placing the four fingers of a hand upon the four front keys during his adding operation and reaching therefrom with the fingers to the rear bank of keys with the greatest ease and with slight exertion. The operator may therefore readily finger the entire set of digit keys with one hand and with great speed.

111 (see Fig. IV) designates a detent that is pivotally attached to the forward upright 7 and the free end of which extends to the periphery of the secondary driving gear wheel 23. This detent is adapted to prevent rotation of said gear wheel and therefore rotation of the remainder of the driving mechanism of the machine associated therewith during the act of winding the main spring of the machine, thereby preventing said gear wheel from acting upon the equalizing or governor gear wheel 24 and causing the equalizing spring 27 associated therewith to be unwound, an action that would result in the absence of any means to restrain the driving mechanism while the main spring is being wound.

112 is a stop for restricting the movement of the detent.

I claim:

1. In an adding machine, the combination of counting wheel mechanism, digit wheel mechanism, a motor, mechanism for imparting motion to said counting wheel and digit wheel mechanism and having therein a power equalizing member, and a trip bar normally engaging a part of said digit wheel mechanism and adapted to be moved into engagement with said power equalizing member to restrain it temporarily, substantially as set forth.

2. In an adding machine, the combination of counting wheel mechanism, digit wheel mechanism, consisting of a power driven wheel and a movably supported digit wheel adapted to be moved to said power driven wheel, a motor, driving mechanism for imparting motion to said counting wheel and digit wheel mechanism, and having therein a power equalizing member, and a trip bar arranged to normally hold said power driven wheel from movement, and adapted to engage said power equalizing member to restrain it temporarily; said trip bar being adapted to be actuated upon the movement of said digit wheel to said power driven wheel, substantially as set forth.

3. In a digit wheel mechanism for adding machines the combination of a power driven wheel, means for driving said wheel, a digit wheel for engagement with said power driven wheel, a swinging support for said digit wheel, means for moving said support, and means for normally holding said power driven wheel from movement adapted to be actuated by said swinging support, substantially as set forth.

4. In a digit wheel mechanism for adding machines, the combination of a power driven wheel having a ratchet wheel associated therewith, a digit wheel for engagement with said power driven wheel, a swinging support for said digit wheels, means for moving said support, and a trip bar arranged to be actuated upon by said swinging supports and having a pawl normally in engagement with said ratchet wheel, substantially as set forth.

5. In a digit wheel mechanism for adding machines, the combination of a digit wheel, means to which said digit wheel is adapted to be moved and by which it is operated, a support for said digit wheel, and means for moving said support; said last named means consisting of a main key stem and a supplemental key stem loosely fitted to said main key stem, and means whereby said key stems are held from movement relative to each other until said digit wheel has been acted upon by said power driven wheel, substantially as set forth.

6. In a digit wheel mechanism for adding machines, the combination of a digit wheel, means to which said digit wheel is adapted to be moved and by which it is operated, a support for said digit wheel, and means for moving said support; said last named means consisting of a supplemental key stem engaging said digit wheel support, a main key stem loosely associated with said supplemental stem, and means for holding said key stems from movement relative to each other until said digit wheel has been acted upon by said power driven wheel, substantially as set forth.

7. In a digit wheel mechanism for adding machines, the combination of a digit wheel, means to which said digit wheel is adapted to be moved and by which it is operated, a support for said digit wheel, and means for moving said support; said last named means consisting of a supplemental key stem engaging said digit wheel support, a main key stem loosely associated with said supplemental key stem, means for holding said key stems from movement relative to each other when they are depressed, and means for restraining said last named means from movement until said digit wheel has been actuated by said power driven wheel, substantially as set forth.

8. In a digit wheel mechanism for adding machines, the combination of a digit wheel, means to which said digit wheel is adapted to be moved and by which it is operated, a support for said digit wheel, and means for moving said support; said last named means consisting of a supplemental key stem engaging said digit wheel supporting means, a main key stem loosely associated with said supplemental key stem, and a dog arranged to engage said supplemental and main key stems to hold them from movement relative to each other and arranged to be tripped by said digit wheel after it has been actuated by said power driven wheel, substantially as set forth.

9. In a digit wheel mechanism for adding machines, the combination of a digit wheel, means to which said digit wheel is adapted to be moved and by which it is operated, a support for said digit wheel, and means for moving said support; said last named means consisting of a supplemental key stem engaging said digit wheel support, a main key stem loosely associated with said supplemental key stem, a dog carried by said supplemental key stem arranged for engagement with said main and supplemental key stems and adapted to be tripped by said digit wheel, and a lock member for holding said key stem from movement after they have been depressed until said digit wheel has been actuated by said power driven wheel, substantially as set forth.

10. In a digit wheel mechanism for adding machines, the combination of a digit wheel, means to which said digit wheel is adapted to be moved and by which it is operated, a support for said digit wheel, and means for moving said support; said last named means consisting of a supplemental key stem engaging said digit wheel support, a main key stem loosely associated with said supplemental key stem, a dog carried by said supplemental key stem arranged for engagement with said main and supplemental key stems and adapted to be engaged by said digit wheel, and a lock member carried by said supplemental stem and engaging said dog to restrain said stems from upward movement after they have been depressed until said digit wheel has been actuated by said power driven wheel, substantially as set forth.

11. In a digit wheel mechanism for adding machines, the combination of a digit wheel, means to which said digit wheel is adapted to be moved and by which it is operated, a support for said digit wheel, and means for moving said support; said last named means consisting of a supplemental key stem engaging said digit wheel support; a main key stem loosely associated with said supplemental key stem, a dog carried by said supplemental key stem arranged for engagement with said main and supplemental key stems and adapted to be engaged by said digit wheel, a lock member carried by said supplemental stem arranged in engagement with said dog to hold it to said digit wheel, and a catch car adapted to be engaged by said lock member, substantially as set forth.

12. In a digit wheel mechanism for adding machines, the combination of a digit wheel, means to which said digit wheel is adapted to be moved and by which it is operated, a support for said digit wheel, and means for moving said support; said last named means consisting of a supplemental key stem engaging said digit wheel support, a main key stem loosely associated with said supplemental stem, each of said stems having a notch therein, a dog carried by said supplemental stem having a catch arm adapted to enter the notches in said main and supplemental key stems and a pawl adapted to be engaged by said digit wheel, and a lock member carried by said supplemental stem and adapted to control the movement of said dog, substantially as set forth.

13. In an adding machine, a counting wheel mechanism comprising a counting wheel shaft, counting wheels loosely mounted upon said shaft, and one of which is provided with a transfer arm, means for driving said counting wheels, a transfer member rotatably and slidably mounted in proximity to said counting wheels and having a pinion for engagement by said transfer arm and a pinion to engage the next adjacent counting wheel and means for shifting said transfer member laterally relative to said counting wheels, substantially as set forth.

14. In an adding machine, a counting wheel mechanism comprising a counting wheel shaft, counting wheels loosely mounted upon said shaft and one of which is provided with a transfer arm, means for driving said counting wheels, a transfer member rotatably mounted in proximity to said counting wheels and having a pinion for engagement by said transfer arm and a pinion to engage the next adjacent counting wheel, and means for shifting said transfer member laterally relative to said counting wheels; said transfer member having as an integral part thereof a multiple arm stop wheel adapted to control the counting wheel from which transfer is made, substantially as set forth.

15. In a counting wheel mechanism for adding machines the combination of a counting wheel shaft, a plurality of counting wheels mounted upon said shaft, means on said shaft for driving said counting wheels, a plurality of shifters arranged in engagement with said driving means, means for supporting said shifters, and key bars arranged to operate in said shifters, substantially as set forth.

16. In a counting wheel mechanism for adding machines, the combination of a counting wheel shaft, a plurality of counting wheels mounted upon said shaft, means on said shaft for driving said counting wheels, a plurality of shifters arranged in engagement with said driving means, means for supporting said shifters, and key bars having throw pins arranged to operate in said shifters, substantially as set forth.

17. In a counting wheel mechanism for adding machines, the combination of a counting wheel shaft, a plurality of counting wheels mounted upon said shaft, means on said shaft for driving said counting wheels, a plurality of shifters arranged in engagement with said driving means, means for supporting said shifters, and key bars having throw pins arranged to operate in said shifters; said shifters being provided with diagonal slots in which said throw pins operate, substantially as set forth.

18. In a counting wheel mechanism for adding machines the combination of a counting wheel shaft, a plurality of counting wheels mounted upon said shaft, means on said shaft for driving said counting wheels, a plurality of shifters arranged in engagement with said driving means, means for supporting said shifters, and key-bars having throw pins arranged to operate in said shifters; said shifters being provided with diagonal slots in which said throw pins operate and said shifter supporting means being provided with vertical slots through which said throw pins pass, substantially as set forth.

19. In a counting wheel mechanism for adding machines, the combination of a counting wheel shaft, a plurality of counting wheels mounted on said shaft, means on said shaft for driving said counting wheels, means for shifting said wheel driving means, transfer members associated with said counting wheels, shifters arranged in engagement with said transfer members, a supporting member for said shifters, and means for operating said shifters, substantially as set forth.

20. In a counting wheel mechanism for adding machines, the combination of a counting wheel shaft, a plurality of counting wheels mounted on said shaft, means on said shaft for driving said counting wheels, means for shifting said wheel driving means, transfer members associated with said counting wheels, shifters arranged in engagement with said transfer members, a supporting member for said shifters, and means for operating said shifters; said shifter operating means comprising key bars provided with throw pins arranged to operate in said shifters, substantially as set forth.

21. In a counting wheel mechanism for adding machines, the combination of a counting wheel shaft, a plurality of counting wheels mounted on said shaft, means for driving said counting wheels, transfer members associated with said counting wheels, a plurality of key bars provided with throw pins, shifters arranged in engagement with said transfer members, and a supporting member for said shifters; said shifters being provided with diagonal slots in which said throw pins operate, substantially as set forth.

22. In a counting wheel mechanism for adding machines, the combination of a counting wheel shaft, a plurality of counting wheels mounted on said shaft, means for driving said counting wheels, transfer members associated with said counting wheels, a plurality of key bars provided with throw pins, shifters arranged in engagement with said transfer members, and a supporting member for said shifters, said shifters being provided with diagonal slots in which said throw pins operate and said shifter supporting member being provided with vertical slots through which said throw pins pass, substantially as set forth.

23. In a counting wheel mechanism for adding machines, the combination of a counting wheel shaft, a plurality of counting wheels mounted on said shaft, means for operating said counting wheels, shifters for actuating said counting wheel operating means, a plurality of key bars for actuating said shifters, and means for throwing the operating means associated with all of said counting wheels out of engagement therewith, substantially as set forth.

24. In a counting wheel mechanism for adding machines, the combination of a counting wheel shaft, a plurality of counting wheels mounted on said shaft, means for operating said counting wheels, shifters for actuating said counting wheel operating means, a plurality of key bars for actuating said shifters, and means for throwing the operating means associated with all of said counting wheels out of engagement therewith; said last named means consisting of a member adapted to throw said key bars and a portion of said shifters in a lateral direction relative to said counting wheels; substantially as set forth.

25. In a counting wheel mechanism for adding machines, the combination of a counting wheel shaft, a plurality of counting wheels, mounted on said shaft, means for operating said counting wheels, shifters for actuating said counting wheel operating means, a plurality of key bars for actuating said shifters, and means for throwing the operating means associated with all of said counting wheels out of engagement therewith; said last named means consisting of a slide arranged for engagement with one of said key bars and adapted to impart lateral movement to the entire series of key bars, and a portion of said shifters, substantially as set forth.

26. In a counting wheel mechanism for adding machines, the combination of a counting wheel shaft, a plurality of counting wheels mounted on said shaft, means for driving said counting wheels, transfer members associated with said counting wheels, shifters arranged in engagement with said transfer members, a slidable supporting bar for said shifters, a plurality of key bars by which said shifters are operated and means for shifting said shifter supporting bar and the shifters mounted thereon relatively to said series of counting wheels, substantially as set forth.

27. In a counting wheel mechanism for adding machines, the combination of a plurality of counting wheels, transfer members associated with said counting wheels, a plurality of shifters for operating said transfer members, a slidable supporting bar on which said shifters are mounted, key bars having engagement with said shifters, and a slide for shifting said supporting bar and shifters laterally relatively to said counting wheels, substantially as set forth.

28. In an adding machine, a counting wheel mechanism comprising a counting wheel shaft, counting wheels loosely mounted upon said shaft and one of which is provided with a transfer arm, means for driving said counting wheels, a transfer member rotatably and slidably mounted in proximity to said counting wheels and having a pinion for engagement by said transfer arm and a pinion to engage the next adjacent counting wheel and means for shifting said transfer member laterally relatively to said counting wheels, substantially as set forth.

29. In an adding machine, a counting wheel mechanism comprising a counting wheel shaft, counting wheels loosely mounted upon said shaft and one of which is provided with a transfer arm, means for driving said counting wheels, a transfer member rotatably and slidably mounted in proximity to said counting wheels and having a pinion for engagement by said transfer arm and a pinion to engage the next adjacent counting wheel and means for shifting said transfer members laterally relatively to said counting wheels; said transfer member having as an integral part thereof a triangular stop wheel, positioned at the periphery of the counting wheel, adapted to control the counting wheel from which transfer is made, substantially as set forth.

JOSEPH H. GINET, JR.

In presence of—
J. M. PINE,
JAS. E. BIRCH.